1

3,355,262
CHEMICAL PROCESS
Francis M. Beaird, Jr., and Paul Kobetz, Baton Rouge, La., assignors to Ethyl Corporation, New York, N.Y., a corporation of Virginia
No Drawing. Filed Sept. 30, 1963, Ser. No. 312,281
7 Claims. (Cl. 23—365)

ABSTRACT OF THE DISCLOSURE

A process for preparing sodium aluminum tetrahydride comprising reacting together sodium aluminum hexahydride, aluminum and hydrogen, the over-all reaction being represented by the equation:

$$Na_3AlH_6 + 2Al + 3H_2 \rightarrow 3NaAlH_4$$

The reaction is conducted in an inert reaction medium at a temperature ranging from 50° C. to 200° C. at a preferred pressure of from about 1000 to about 5000 pounds per square inch.

---

This invention relates to a new and novel process for the manufacture of sodium aluminum tetrahydride, $NaAlH_4$.

Heretofore sodium aluminum hydride, $NaAlH_4$, has been made by one of two major processes. The Schlesinger-Finholt process involves the reaction of sodium hydride and aluminum chloride according to the following equation:

$$4NaH + AlCl_3 \rightarrow NaAlH_4 + 3NaCl$$

Processes of this character are described in Patent 2,567,972.

Another major process for the manufacture of sodium aluminum tetrahydride is the Ashby process, described in French Patent 1,235,680. According to this process, sodium, or if desired, sodium hydride, and aluminum metal, preferably in highly subdivided form, are subjected to pressure hydrogenation in a stable reaction medium, the sodium component and the aluminum being in approximately equal molal proportions, although frequently, the aluminum is used in some excess.

The object of the present invention is to provide a process for the manufacture of sodium aluminum tetrahydride. A particular object is to provide a process wherein the reactants include a different component than heretofore used, namely, sodium aluminum hexahydride, $Na_3AlH_6$, aluminum, and hydrogen. An object of certain preferred embodiments is to provide a novel two-stage process for obtaining sodium aluminum tetrahydride.

The present process in all forms involves carrying out a reaction between sodium aluminum hexahydride, aluminum metal, and hydrogen, in a mixed phase reaction system, under elevated hydrogen pressure. The reaction accomplished is as follows:

$$Na_3AlH_6 + 2Al + 3H_2 \rightarrow 3NaAlH_4$$

In carrying out the foregoing reaction, a reaction temperature of the order of about 50 to 200° C. is employed, a preferred temperature range being about 100 to 200° C., and an even more preferred range being about 140 to 200° C. with certain media and 100 to 140° C. with certain other reaction media. The components are provided, as indicated in the equation, in approximately the proportions of about one mole of sodium aluminum hexahydride, $Na_3AlH_6$, and two atoms of aluminum, and the hydrogen is consumed in substantially the proportions indicated by the equation.

As stated, an organic inert liquid reaction medium is provided, generally in the proportions of about 50 to 1000 ml. per gram atom of the sodium content of the sodium aluminum hexahydride, a preferred range being 100 to 500 ml. By inert is meant that the liquid medium is stable or essentially non-reactive with the reactants or product at the reaction conditions used. The liquid reaction media are selected generally from the class of organics consisting of ethers, aliphatic hydrocarbons, and aromatic hydrocarbons, and mixtures thereof. Included in the category of ethers are the simple dialkyl ethers, preferably those having at least three carbon atoms in each alkyl group. More preferred than the simple dialkyl ethers are the lower dialkyl ethers of lower polyethylene glycols, and cyclic ethers, especially tetrahydrofuran. The most preferred temperature range of about 140 to 200° C. is associated with the hydrocarbon reaction media, but the lower preferred range of about 100 to 140° C. is associated with the cyclic ether compounds as certain of these can be cleaved by and will react with the sodium aluminum hydride at temperatures of about 140° C. or above, dependent on the proportions present.

In carrying out the process, an elevated pressure is used, which can be from slightly above one atmosphere up to, for example, about 700 atmospheres, a preferred range of pressures being from about 1000 to 5000 pounds per square inch.

The sodium aluminum hexahydride employed as a reactant is a granular crystalline material, which is insoluble in most of the materials employed as reaction media. Hence, it is surprising that a reaction will occur between this solid material and the aluminum components even though both are solids at the reaction conditions involved.

The aluminum, as already indicated, is preferably in highly subdivided particulate form, in order to provide significant surface and an appreciable reaction rate. The aluminum is preferably activated by previous treatment. For best results, a catalyst comprising an alkyl compound of aluminum or a similar organometallic material is provided, in minor and catalytic proportions, of the order of about 0.1 to 5 volume percent of the liquid reaction medium.

The reaction mixture should be vigorously agitated, and a good degree of completion of reaction will be experienced in a reaction period of 6 to 24 hours.

The mode of carrying out the process will be more readily understood from the following working examples and the further description hereinafter. All proportions are in weight units, except where otherwise specified.

Example 1

A Magne-Dash autoclave was charged with the following components:

| | |
|---|---|
| $Na_3AlH_6$ | g__ 12 |
| Aluminum powder | g__ 6.3 |
| Toluene | ml__ 125 |
| Triethyl aluminum | ml__ 0.6 |

The aluminum in the foregoing charge was in the proportions of two g. atoms per g. mole of the sodium aluminum hexahydride, the toluene being in proportions of about 350 ml. per gram atom of sodium (1.05 liters per g. mole of the sodium aluminum hexahydride). The aluminum had been previously activated by heating under triethyl aluminum for several hours at 100° C. or over.

The charge was lightly pressurized with hydrogen gas, and the autoclave and contents were heated to 160° C. The hydrogen pressure was raised to 5000 pounds per square inch pressure, and these conditions were maintained while agitating vigorously.

Significant reaction, as shown by a drop in the hydrogen pressure, began after about four hours after initiation of reaction conditions. Following this initiation, hydrogen take-up continued smoothly for eight hours. The autoclave was cooled and analysis of the product showed an 80 percent conversion to sodium aluminum hydride. The product was provided as very fine gray solids suspended in the toluene reaction medium.

Additional examples are summarized in the following table:

sodium hydride or sodium, respectively, per atom of the aluminum metal. The reaction carried out can be expressed as $$3Na + Al + 3H_2 \rightarrow Na_3AlH_6$$

It should be understood that variation from these precise proportions can be permitted, thus proportions of from

| Example | Aluminum to Sodium Alum. Hexahydride (g. atoms/ g. mole) | Reaction Medium | | Operating Conditions | | | Catalyst | |
|---|---|---|---|---|---|---|---|---|
| | | Material | Proportion Ml./g. atom of Na | Temp., °C. | Pressure, P.s.i.g. | Reaction Time, Hr. | Material | Ml. per 100 ml. of Reaction Medium |
| 2 | 1.9 | Dimethyl ether of diethylene glycol. | 150 | 115 | 6,000 | 24 | Tri-isobutyl aluminum. | 3 |
| 3 | 2.3 | Dimethyl ether of ethylene glycol. | 500 | 180 | 5,000 | 10 | Diethyl aluminum hydride. | 2 |
| 4 | 2.5 | Tetrahydrofuran | 375 | 140 | 4,000 | 15 | Trimethyl aluminum. | 5 |
| 5 | 2.1 | Methyl ethyl ether of diethylene glycol. | 400 | 190 | 3,000 | 18 | (None) | |
| 6 | 2.05 | 2,2,2-trimethyl pentane | 450 | 210 | 8,000 | 6 | Triethyl aluminum. | 5 |
| 7 | 3.0 | o-Xylene | 100 | 190 | 4,000 | 4 | Diisobutyl aluminum hydride. | 1.5 |
| 8 | 2.0 | Di-n-hexyl ether | 400 | 160 | 5,000 | 10 | (None) | |

As indicated in the foregoing examples a variety of conditions can be employed quite effectively in the numerous embodiments of the process. With certain solvents having relatively high ethereal oxygen content, such as the dimethyl ether of diethylene glycol, the sodium aluminum hydride product is in solution in the reaction medium. It is preferable in most cases to use a reaction medium which is not a solvent, such as toluene. In certain instances the sodium aluminum hydride can be successfully crystallized from a reaction medium which is a solvent, but in other cases it complexes rather strongly, so that isolation as a crystallized product is not feasible.

Some solvents, particularly tetrahydrofuran, should not be subjected to operations at the higher temperatures, owing to its susceptibility to attack by sodium aluminum tetrahydride if exposed in high concentrations at temperatures above 140° C.

The proportions of reaction medium can be greatly varied. Generally, liquid media in proportions of about 50 to 1000 mls. per gram atom of the sodium content of the sodium aluminum hexahydride is used, a preferred range being 100 to 500 ml.

As already stated, reaction pressures of from about one atmosphere to about 700 atmospheres can be used. A preferred range is 1000 to 5000 pounds per square inch. Higher pressures tend to shorten the reaction period required, but mechanical and design problems substantially increase above 5000 pounds pressure.

As previously illustrated a catalyst is frequently and profitably used, the preferred catalysts being alkyl aluminum compounds as shown in certain of the examples. Other catalysts which contain a hydrocarbon radical attached to an active metal can be substituted for the aluminum compounds specifically illustrated. Thus, sodium ethyl or tetraethyl sodium aluminum can be used in place of the catalysts specifically illustrated, and similar results will be attained.

A special class of embodiments of the present invention involves incorporation of the reaction as the second stage of a two-stage process for the manufacture of sodium aluminum tetrahydride, NaAlH₄. According to such embodiments, a sodium reactant, either sodium metal or sodium hydride, plus subdivided aluminum, is pressure hydrogenated in the presence of a liquid reaction medium stable at reaction conditions and under conditions generally similar to the main process step of the invention. The sodium reactant is provided in approximately the atomic ratio necessary to provide sodium aluminum hexahydride, viz., preferably about three moles or atoms of about two and one-half to four atoms per atom of aluminum are permissive. The ranges of temperatures and pressures employed correspond generally to these operating conditions as already stated for the conversion of sodium aluminum hexahydride to sodium aluminum tetrahydride. Upon sufficient take-up of hydrogen to correspond to a significant yield of sodium aluminum hexahydride, this step is discontinued. Usually the pressure is released and additional aluminum is provided to correspond to the principal reaction of the process as described above. When desired, the reactor charge from the first stage can be transferred to a second stage reactor for this final operation. Generally, it is found that the first stage, viz., the conversion of the sodium reactant and aluminum to a composition approximating sodium aluminum hexahydride, is at an appreciably higher take-up rate or reaction rate than is experienced at comparable conditions for the final stage of the process.

The following example illustrates generally this two-stage class of embodiments.

*Example 9*

Approximately 110 parts of the dimethyl ether of diethylene glycol, 24 parts by weight of sodium hydride and about 10 parts of finely comminuted aluminum metal are introduced to the autoclave. The reactor is closed and pressured with hydrogen at an initial pressure of about 5000 pounds per square inch. A reaction temperature of about 140° C. is provided, and the hydrogen pressure dropped steadily, at the rate of about 300 pounds per square inch per hour. After sufficient hydrogen is absorbed to correspond to a take-up providing the formation of sodium aluminum hexahydride, the reaction is discontinued, and the autoclave and contents cooled to ambient temperature, the excess hydrogen pressure being vented. About 20 parts of additional aluminum metal are then added, and reaction is continued. A high yield of sodium aluminum tetrahydride is achieved.

When similar operations, employing the reaction media and conditions described in Examples 1–8, are provided, but the reactants are charged in the proportions indicated, followed by addition of further aluminum, similar ultimate results are achieved.

In some instances it will be desirable to separate the sodium aluminum hexahydride generated in the first stage from the liquid of the reaction medium, and to charge in the second stage a different reaction medium as well as the additional aluminum required.

We claim:

1. The process for making sodium aluminum tetrahydride comprising reacting sodium aluminum hexahydride, aluminum and hydrogen in the presence of an organic liquid reaction medium stable at reaction conditions, said medium being selected from the group consisting of ethers, aliphatic hydrocarbons, and aromatic hydrocarbons and the reaction being at a pressure of about 1000 to 5000 pounds per square inch and at a temperature of about 100 to 200° C.

2. The process of claim 1 further defined in that the liquid reaction medium is an aromatic hydrocarbon, and the pressure is about 1000 to 5000 pounds per square inch.

3. The process of claim 1 further defined in that the liquid reaction medium is an ether, the pressure is about 1000 to 5000 pounds per square inch and the temperature is about 100 to 140° C.

4. The process of claim 3 further defined in that the liquid reaction medium is tetrahydrofuran.

5. The process of claim 1 further defined in that the liquid reaction medium is the dimethyl ether of diethylene glycol and the pressure is about 1000 to 5000 pounds per square inch.

6. The process for making sodium aluminum tetrahydride comprising reacting sodium aluminum hexahydride, aluminum and hydrogen in the presence of toluene as a liquid reaction medium, said toluene being in the proportions of 100 to 500 mls. per gram atom of sodium in the sodium aluminum hexahydride, and in the presence of an alkyl aluminum catalyst in the proportions of about 0.1 to 5 volume percent of the toluene, the aluminum being in the proportions of about two atoms per mole of sodium aluminum hexahydride, the reaction being at a pressure of about 1000 to 5000 pounds per square inch and at a temperature of 100° to 200° C.

7. The process for making sodium aluminum tetrahydride including
   a first stage comprising reacting a sodium reactant selected from the group consisting of sodium and sodium hydride, subdivided aluminum, and hydrogen, in the presence of an organic liquid reaction medium stable at reaction conditions, said medium being selected from the group consisting of ethers, aliphatic hydrocarbons, and aromatic hydrocarbons, and the reaction being at a pressure of about 1000 to 5000 pounds per square inch and at a temperature of 100 to 200° C., the sodium reactant being in the proportions of about 2½ to 4 moles per atom of the aluminum, forming thereby a reaction mixture including sodium aluminum hexahydride, and
   a second stage comprising adding additional aluminum to the reaction mixture from the first stage in the proportions of about two atoms per three moles of the original sodium reactant of the first stage, and further reacting with hydrogen and forming thereby sodium aluminum tetrahydride.

References Cited

FOREIGN PATENTS 1,235,680 5/1960 France.

OTHER REFERENCES

Zakharkin et al.: "Dokl. Akad. Nauk. SSSR," vol. 145, pp. 793–796, August 1962.

MILTON WEISSMAN, *Primary Examiner.*

OSCAR R. VERTIZ, *Examiner.*